United States Patent [19]

Brundage et al.

[11] Patent Number: 5,223,188
[45] Date of Patent: Jun. 29, 1993

[54] STIFFENING OF EXTRUDATES WITH RF ENERGY

[75] Inventors: Kevin R. Brundage, Corning; Donald L. Guile, Horseheads; Merrill Lynn, Big Flats, all of N.Y.

[73] Assignee: Corning Incorporated, Corning, N.Y.

[21] Appl. No.: 880,906

[22] Filed: May 8, 1992

Related U.S. Application Data

[63] Continuation of Ser. No. 604,107, Oct. 29, 1990, abandoned.

[51] Int. Cl.$^5$ .................. B29C 35/14; B29C 47/12; B29C 47/88
[52] U.S. Cl. .................. 264/26; 219/10.41; 219/10.55 M; 219/10.57; 264/177.11; 264/177.12; 264/211.11
[58] Field of Search .............. 264/25, 26, 177.11, 264/177.12, 211.11; 34/1; 219/10.41, 10.55 M, 10.57

[56] References Cited

U.S. PATENT DOCUMENTS

| | | | |
|---|---|---|---|
| 2,521,128 | 9/1950 | Ramsay | 264/26 |
| 3,372,445 | 3/1968 | Maurer et al. | 425/174 |
| 3,790,654 | 2/1974 | Bagley | 264/177.11 |
| 3,953,703 | 4/1976 | Hurwitt | 219/10.55 M |
| 4,162,285 | 7/1979 | Tanabashi | 264/66 |
| 4,439,929 | 4/1984 | Kitagawa | 34/1 |
| 4,478,563 | 10/1984 | Lhommeau et al. | 425/71 |
| 4,725,391 | 2/1988 | Bardhan et al. | 264/82 |
| 4,764,102 | 8/1988 | Takahashi | 425/466 |

FOREIGN PATENT DOCUMENTS

| | | | |
|---|---|---|---|
| 141970 | 6/1980 | German Democratic Rep. | 264/26 |
| 2222095 | 2/1990 | United Kingdom . | |

OTHER PUBLICATIONS

*Handbook of Water-Soluble Gums and Resins,* New York, McGraw-Hill, 1980, pp. 4-1 and 4-11.
Hercules Product Data Sheet No. 402C (undated).

*Primary Examiner*—Leo B. Tentoni
*Attorney, Agent, or Firm*—Angela N. Nwaneri

[57] ABSTRACT

A method of stiffening plastically deformable material, newly forming or formed into a shaped body, is disclosed. The method includes; exposing the material, which includes body-forming matter, polar molecules, and a polymeric agent having a thermal gel point, to electromagnetic radiation within the frequency range $10^7$ to $10^{13}$ Hertz. The radiation is applied while plastically deformable material is contained in, or as it emerges from a forming member in the shape of a body.

20 Claims, 2 Drawing Sheets

STIFFENING OF EXTRUDATES WITH RF ENERGY

BACKGROUND OF THE INVENTION

This is a continuation of application Ser. No. 07/604,107, filed Oct. 29, 1990, now abandoned.

This invention relates to a method for stiffening newly formed material, which is plastically deformable, comprising application of radio frequency energy to said material. In one embodiment radio frequency energy is directed toward, or applied to, an extruded plastically deformable ceramic material at the face of the forming member of an extruder to form a substantially, firmly self-supporting ceramic body but, more particularly, this invention relates to a method for stiffening material as it is formed into a honeycomb type structure.

A long-standing problem with forming of plastically deformable materials which use liquids as part of the plasticizing system has been the delicate balance which is necessary to maintaining material which is plastic enough to form with relative ease, and creating a body which is self-supporting and is able to be handled upon formation. This is a particular problem with pseudoplastic or thixotropic materials which use a liquid as part of the plasticizer since such a material tends to exhibit lowered viscosity immediately after forming as a result of the effects of "shear-thinning" inherent in any forming operation involving the application of shear stress on the material.

Generally as the viscosity of the plastically deformable material is lowered, the wet, formed structure or article tends to collapse since it is not completely self-supporting. Conversely as the viscosity of the plastically deformable material is increased to create a self-supporting final extruded body, forming of the material tends to require significantly higher forming pressures which in turn means that it becomes necessary to use heavier equipment, more substantial forming members, and abrasion resistant parts.

Forming systems have been used which depend on radiant or convective application of heat to a wet, formed article or body to evaporate liquids from the plastically deformable material forming the body. In general, as liquid (commonly water) is removed, the strength of the formed body tends to increase and the body becomes more capable of self-support. A particular problem with the application of heat in such an instance is that surface defects, such as cracks, checks and fissures, tend to develop when heat is applied. While not wishing to be bound by theory, these defects may arise through several mechanisms. Two likely reasons include: 1) Heat tends to dry the immediate surface which is nearest the heat source causing the formation of a "skin". Formation of said skin is generally undesirable in that the surface skin tends to retard further evaporative drying of the body. This means that as heat is continued to be applied, the skin tends to become thicker while liquids on the interior of the body rise in temperature toward their boiling points. As the boiling point is reached, vapor is formed from the liquids within the body which then rapidly expands and some how finds a release from the body generally by creating a crack, check, or other such surface defect. 2) As heat is applied, the outer layer shrinks through evaporation and loss of volume. This places the outer areas in tension while the inner areas, which are not shrinking since the heat has not reached deeply enough yet, retain their dimensions and are therefore placed under compression. These competing stresses find relief through formation of a crack or other similar defect. Further, it is difficult to evenly apply heat to an entire formed body to aid in the rapid yet necessarily even drying which is desirable.

With current technology, there is extreme difficulty in forming a thin-walled self-supporting body from a plastically deformable material which can be firmly handled without deforming the body, particularly when liquid is used as part of the material plasticizing system. The solution to this problem generally has been either simply not to attempt to form thin-walled structures, to form only relatively thick-walled bodies, or to create a material which is thermosetting and may be cross-linked or which is thermoplastic and can be stiffened by rapid cooling. After a self-supporting body has been formed, from a plastically deformable material using liquid as part of a plasticizing system, it has been necessary to dry it to remove the liquid prior to sintering particulate material or to harden the formed material to enable machine handling. One recognized method of drying substantially self-supporting formed bodies has been by the application of dielectric or high frequency energy. These techniques have been demonstrated in U.S. Pat. Nos. 4,439,929, 3,953,703, and 3,372,445 as described below.

U.S. Pat. No. 4,439,929 issued to Kitagawa et al. Apr. 3, 1984 teaches an apparatus for drying ceramic green honeycomb bodies. The apparatus described includes two facing electrodes having a space between them through which said green ceramic honeycomb bodies may be passed while a dielectric heating energy source is connected to the electrodes and activated. An electric field, which encompasses the green ceramic honeycomb body is created within the space between the electrodes. The electric field then causes the creation of heat energy within the green ceramic body by excitation of the polar water molecules included within the body. The heat energy generated within the body raises the temperature of the body to the evaporation point of the liquids, thereby causing drying of the body.

U.S. Pat. No. 3,953,703 issued to Hurwitt Apr. 27, 1976 teaches a method for drying ceramic tape. Hurwitt's method involves the use of high frequency energy, preferably in the microwave range, to uniformly raise the temperature of ceramic slip which has been cast on a belt to evaporate volatile solvents from the interior of the tape without forming a barrier skin on the surface of the thin layer of slip.

U.S. Pat. No. 3,372,445 issued to Maurer et al. Mar. 12, 1968 describes a press for drying ceramic and other materials in the plastic state which involves predrying the extruded ceramic material prior to its separation from the press. Maurer's press includes a minimum of three axially elongated electrodes connected to a source of polyphase electric current and arranged such that extruded material, particularly ceramic material in the plastic state, is passed through the space in the center of said electrodes for the purpose of predrying the material prior to its separation from the press. Maurer et al. teach that extruded ceramic material, which passes through the space surrounded by the mentioned electrodes connected to a polyphase current source, is heated and dried by the electric field created by the electrodes.

Due to the difficulty of rendering a plastically deformable material firmly self-supporting, a number of techniques have been developed to solve the problems encountered. Of the several approaches used to create firmly self-supporting, newly formed bodies from plastically deformable materials, none have involved the inventive method of applying RF energy to a material comprising water and a polymeric agent having a thermal gel point. One example is described in U.S. Pat. No. 4,725,391 issued to Bardhan et al. Feb. 16, 1988. This patent teaches a method of extruding thin-walled ceramic bodies the plastically deformable starting material for which includes a thermosetting organic alcohol. Said material is then extruded into an atmosphere comprising a cross linking agent. On extrusion, cross linking of the organic resin is initiated which rapidly forms a stiffened ceramic body capable of being handled shortly after extrusion.

U.S. Pat. No. 4,478,563 issued to Lhommeau et al. Oct. 23, 1984 describes an apparatus for extruding and cooling, or stiffening, cellular structures formed of thermoplastic resins. In this patent, it is taught that a thermoplastic material is extruded through a die at an elevated temperature and then quickly stiffened by application of cooling fluids to the extruded body.

U.S. Pat. No. 4,162,285 issued to Tanabashi Jul. 24, 1979 teaches a method for producing ceramic honeycomb structures having no cracks. Tanabashi teaches the use of a plastically formable ceramic material containing water and polymeric thickeners but it also instructs the addition of a polyhydric alcohol to the extrusion material. Tanabashi's use of the two component thinner, i.e. polyhydric alcohol and water allows the extruded body to be dried in two distinct steps thereby reducing the likelihood of creating surface defects through the formation of skin during drying.

Published British Patent Application, GB 2,222,095, describes and claims a filtration apparatus in which filter cakes are formed on a filter cloth, the cakes are placed under vacuum to remove moisture, transferred by a conveyor to a means for directing electromagnetic radiation at the cakes to complete the evaporation of moisture under vacuum and therefore at a lower temperature than would normally be required under ambient conditions.

Some plastically deformable materials contain a thickener, generally a polymeric agent, which is employed to increase and control the viscosity of said material. Several of these polymeric thickening agents, particularly polysaccharides including starches and cellulose derived thickeners such as cellulose ethers have a thermal gel point. Said polymeric thickeners having such a gel point generally display a decrease in viscosity with an increase in temperature. Therefore, plastically deformable material containing such a polymeric thickeners having a gel point will display fairly typical behavior in that as temperature is increased toward the gel point, viscosity decreases but when the gel point is reached there is a very rapid increase in viscosity with increasing temperature.

Plastically deformable materials containing a polymeric thickener having a gel point tend to be worked and formed at temperatures just below the gel point of the polymeric thickener. This allows forming to occur at a relatively low viscosity, that viscosity being reached by elevating the material temperature to very near the gel point, thereby gaining the benefits of extrusion at a fairly low viscosity. Problems arise in that material temperature, and therefore viscosity, are both very difficult to control in this area because a slight rise in temperature either by application of heat to the forming equipment, by gain of heat through frictional forces within the equipment, or through shearing action of the extruding material within the forming member. Crossing the gel point by addition of further heat to the system causes problems in extrusion associated with increased viscosity and the resulting loss of plasticity, including missing cell walls usually resulting from the inability of the high viscosity material to pass through channels in the forming member, poorly formed skin generally resulting from the tendency of the high viscosity material to pull apart and break under pressure, and various other defects necessitating higher extrusion pressures for avoidance of these problems. Such higher pressure then causes more abrasion of the equipment and necessitates generally heavier equipment. Generally, attempting to control material temperature within this very narrow temperature range near the polymeric thickener's gel point raises difficulty as to what should be done with the newly formed material as it exits from the forming member. Plastically deformable material containing a polymeric agent having a thermal gel point will be difficult to form above said agent's gel point since the viscosity of said material will be extremely high, causing severe difficulty in working the material. If material which is formed at temperatures below the gel point is heated to remove liquids or to reach the gel point, it runs the risk of sagging or deforming through the simple mechanism of crossing through the reduced viscosity region inherent in the plastically deformable material, which contains a polymeric agent having a thermal gel point, as the temperature is increased just prior to the gel point.

These general problems, encountered while working and forming the described plastically deformable materials, become severe and cause tremendous difficulty when the materials are used to form articles having very thin walls. Past commercial practice has allowed extrusion of ceramic honeycomb articles having wall thicknesses in the range of 0.006–0.009 inch (0.152 mm–0.23 mm). The problem of forming a firmly self-supporting article with high enough wet-strength to allow reasonable handling without causing deformation became particularly severe, as we discovered, when articles having wall thicknesses in the range of about 0.0025–0.006 inch (about 0.06–0.15 mm) were attempted to be formed. The present invention resolves these problems by causing stiffening of the plastically deformable material as it is formed so the resultant formed body can be handled with no deformation.

SUMMARY OF THE INVENTION

The present invention provides for a method of stiffening plastically deformable material newly formed into a shaped article or body. The material comprises body-forming matter or material, polar molecules, and a polymeric agent having a thermal gel point. By exposing the material to electromagnetic radiation or energy within the frequency range $10^7$ to $10^{13}$ Hertz (hereinafter referred to as RF or radio frequency energy) while the material passes through or as it emerges from a forming member as a shaped body. This allows the formed material, particularly an extruded ceramic body, to be handled without damage. The stiffening prevents the sagging or handling deformation of the formed body which is likely to occur when the batch has a low wet strength and is not wholly self-supporting. The stiffening is accomplished by application of electromagnetic energy or radiation, preferably in the radio frequency range but use of infrared energy will yield a similar effect, as the material, which is usually pseudoplastic or thixotropic, is formed and for a time sufficient to cause the formed green or unfired body to have firmly self-sustaining shape. This stiffening process is effective when polar molecules are included in the formable batch materials. This takes advantage of the coupling effect displayed by polar molecules on exposure to said electromagnetic energy. The stiffening process further appears to be particularly effective when polymeric agents having a gel point are present in the plastically deformable material with the polar molecules. While not wishing to be bound by theory, it appears that the stiffening is effected through the heating of the polar liquid molecules and the consequent evaporation of some of said polar molecules to yield a partial drying of the formed batch materials. It is also possible that when polymeric agents having a gel point are present in the plastically deformable material that the heating caused by the excitation and coupling of the polar liquid molecules in the material causes a crossing of the gel point of the polymeric agent thereby enhancing the desired stiffening effect of the formed batch materials. It is also possible that a combination of these two events takes place. The body-forming matter is usually a particular matter or material which is sinterable such as, for example, ceramic, glass, and/or organic powders.

It will be readily apparent to those skilled in the art that such a method of rapid stiffening of formed plastically deformable material which contains body forming matter and an agent having a thermal gel point will be particularly advantageous not only in extrusion processes but will also find utility in other processes including, but not limited to molding, pressing, or stamping.

DETAILED DESCRIPTION OF THE PREFERRED EMBODIMENTS

In a preferred embodiment of this invention, a radio frequency generating means is placed at the exit of the forming member of an extrusion apparatus. Plastically deformable material is placed in the extrusion apparatus and processed according to typical extrusion processing methods. The inventive aspect here is that as the plastically deformable material, comprising polar molecules and a polymeric agent having a thermal gel point, is contained in or exits the forming member, radio frequency energy or radiation is applied to it. As the radio frequency energy is applied to the extrudate either within the forming member or upon its exiting the forming member, the extrudate is stiffened. Application of the radio frequency energy or radiation in the manner described causes stiffening of the extrudate to the point that it becomes firmly self supporting and is therefore not easily deformed as is an extrudate when formed without the benefit of the application of the radio frequency energy to the material as it is formed.

Figure 1:
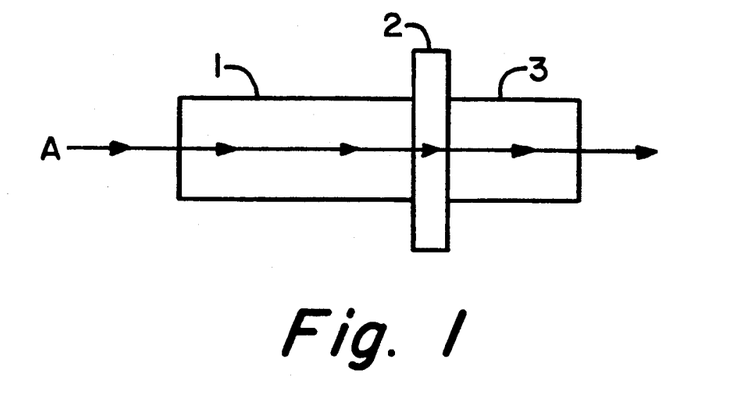
FIG. 1 is a schematic representation of the material flow through a delivery means, through a forming member, and through a radio frequency means.

In accordance with this invention, the plastically deformable material, which is usually pseudoplastic or thixotropic, is formed by a forming member and radio frequency energy is applied to it upon its formation either while the material is within the forming member or upon the material's exiting the forming member, as represented schematically in FIG. 1. This is exemplified by the placement of a radio frequency energy source (3) immediately on the exit side of the forming member (2) of a forming system so that material moves in direction (A) through a feed means (1), such as an extruder, into a forming member (2), such as an extrusion die, and exits immediately into a radio frequency energy source (3) in which source (3) the stiffening of the formed material begins immediately after forming. Thus as the plastically deformable material is processed and extruded, radio frequency energy is impinged upon it as it exits the forming member of the extrusion system. Substantial stiffening is attained in this manner and the fresh extrudate, after having traversed the space wherein the radio frequency energy is applied, becomes firmly self supporting and much less subject to handling damage and may therefore be treated in a much less delicate fashion.

Another preferred embodiment of this invention involves the extrusion of plastically deformable material comprising water, a polymeric thickener having a thermal gel point, and cordierite-forming particulate material. Such plastically deformable material, upon final sintering, forms a cordierite material which is particularly suitable for use as a catalyst substrate. In processing the plastically deformable material, its components are mixed to form a pseudoplastic material which can be deformed by application of shear stress. Said material is then processed by typical extrusion processing means, such as is described in U.S. Pat. No. 3,790,654, which is incorporated herein by reference, and is eventually forced through a forming member which forms the material into a "honeycomb" type structure. The honeycomb is defined by intersecting walls surrounding open, elongated cells extending longitudinally through the formed body. The present invention is particularly suited to the process of extruding honeycomb type ceramic products. In past practice, the as-extruded honeycomb body has a generally low wet strength, particularly when extremely thin, for example, less than about 0.008 inch (about 0.20 mm), internal walls are formed, and is not generally firmly self supporting. This latter characteristic makes it subject to damage through deformation of the extruded body. Such deformation of the extruded wet honeycomb structure is particularly likely when the walls of the honeycomb structure are very thin, generally 0.008 inch (0.20 mm) or less, and particularly when less than 0.005 inch (about 0.13 mm) thick.

The generally uniform generation of heat throughout the entire cross section of the extruded honeycomb structure extending the entire length of the structure within the RF heating means and extending back to the forming member appears to either dry the extruded body through relatively uniform evaporation of water, gel the polymeric thickener, or a combination of both. The inventors do not wish to be bound by theory, but the three preceding possibilities are offered as potential explanations for the reality of the stiffening of the extruded body as it exits the forming member.

It will be apparent to those familiar with the art that the advantages of the present invention, which serves to uniformly stiffen a plastically deformable batch upon its formation into a desired shape, include: (1) reduction of sagging or handling deformation through lack of adequate wet green strength, (2) reduction of surface defects which, by past practices, appear to be generally caused by nonuniform drying through the application of heat, and (3) the ability to produce bodies, particularly honeycomb type structures, with much thinner walls which become self supporting through the immediate stiffening step provided by the inventive method.

The inventive method was tested on extruded cordierite-forming material formed into the previously described honeycomb type structure. The plastically deformable material contained the following materials:

| Ingredient | Supplier | Wt. % of Dry Material |
|---|---|---|
| Raw Clay (Hydrite MP) | Georgia Kaolin | 4.69 |
| Raw Clay (Hydrite PX) | Georgia Kaolin | 14.03 |
| Calcined Clay (Glomax LL) | Georgia Kaolin | 27.13 |
| Talc (95-28) | Pfizer | 40.54 |
| Alumina (A-16 SG) | Alcoa | 13.61 |
|  |  | 100.00 |

| Plasticizing Material | Supplier | Wt. % of the Above Defined Dry Materials |
|---|---|---|
| Methyl Cellulose | Dow Chemical | 2.9 |
| Sodium Stearate | Proctor & Gamble | 1.0 |
| Cold Deionized Water | N/A | 30.0 |

Figure 2:
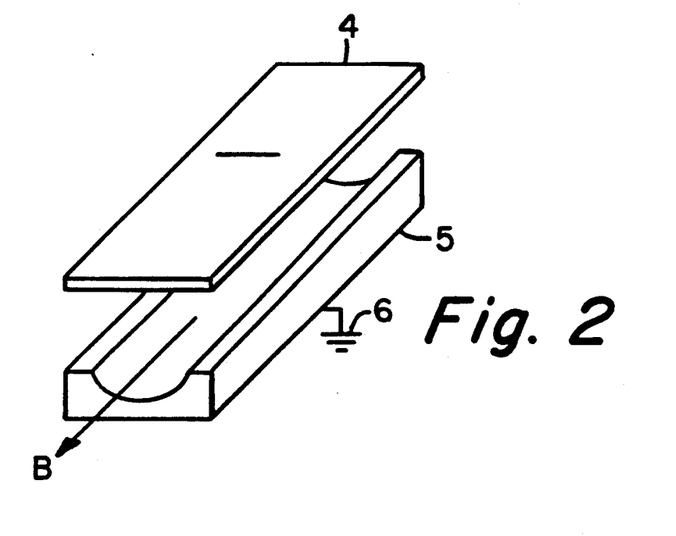
FIG. 2 is a view of a radio frequency heating means comprising a planar and a concave electrode.
Figure 3:
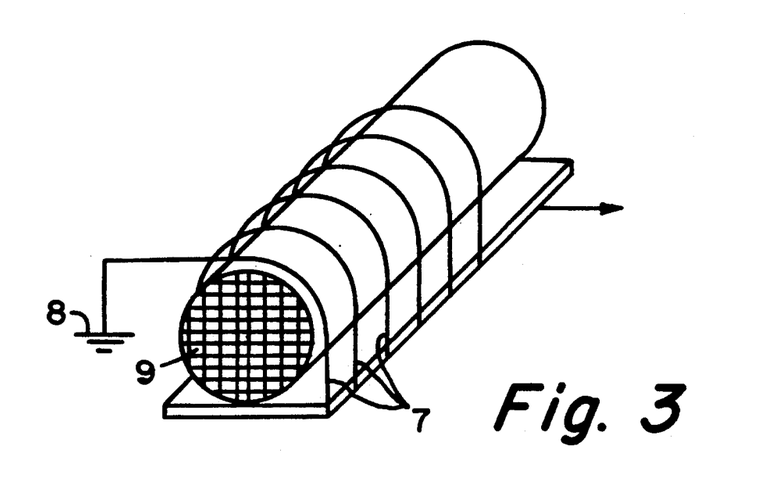
FIG. 3 is a view of a honeycomb structure within a coil-type electrode of a radio frequency heating means.
Figure 4:
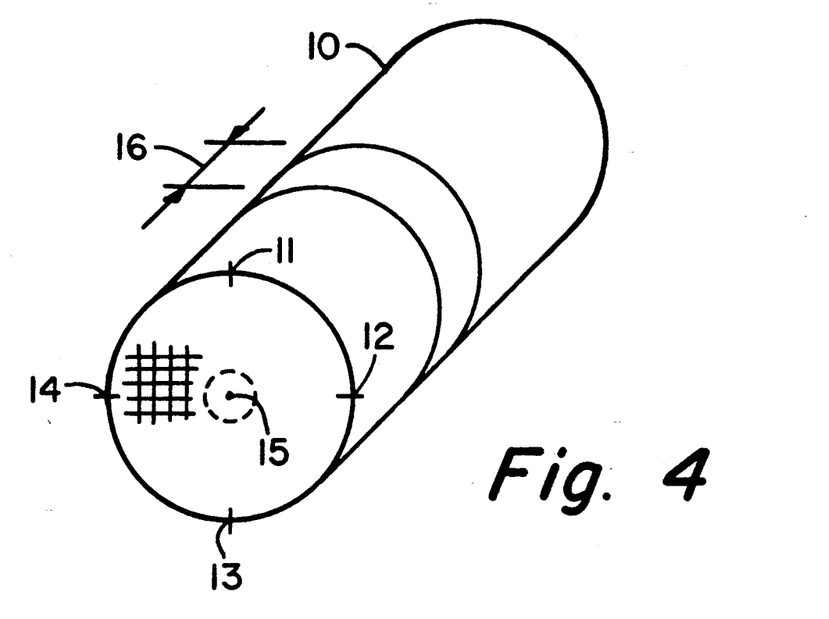
FIG. 4 is a perspective view of a formed honeycomb structure demonstrating the approximate location of temperature measurements as taken with a probe plunged from the proximal end of the structure during experiments described below.

After thorough mixing, the above described plastically deformable material was extruded into a honeycomb structure with a transverse cross section of substantially an oval with major and minor axes of about 6.25 inches (15.9 cm) and 3.5 inches (8.9 cm) respectively, and having 400 cells per square inch (about 62 per cm$^2$) and approximately 0.0055 inch (0.14 mm) thick walls defining the cells. The plastically deformable material was extruded, in the form described, from the exit face of a die, into a space in which radio frequency energy was being generated by an 8 KW dielectric dryer. The particular dryer being used was supplied by Thermex Thermatron and was a model CP-30. Radio frequency energy was applied as the plastically deformable material exited the extrusion die and passed through the space between the electrodes connected with the RF dryer. The electrodes were either:

1) a planar upper electrode (4) and a curved cast aluminum air bearing which served as the lower electrode (5) connected to a radio frequency energy source (6) and situated on opposite sides of the short dimension of the oval, as shown in FIG. 2, such that the formed material travels in direction (B) between the electrodes, or 2) a coil formed to be approximately 1 inch (about 2.5 cm) larger in opening at all points than the cross section of the extrudate, as shown in FIG. 3, in which the coil (7) is connected to a radio frequency energy source (8) and the article formed from the material (9) fits within the coil (7). Further, the coil was made of ½ inch (about 13 mm) diameter copper tubing. The overall length of the coil was approximately 7¼ inches (18.4 cm) and had about one turn of copper tubing per linear inch (about 0.4 turns per linear centimeter) of the overall coil. Temperature measurements were taken at various points within the extruded article immediately after it passed through the radio frequency heating device. Care should be taken in viewing data presented in the various tables since temperatures were measured sequentially, as presented in the tables, with a single probe. The approximate locations of measurements are demonstrated in FIG. 4. Such measurements were taken by plunging the probe from one end of an extruded article (10) to about the middle (range 16) of the article (10) at the following positions of the transverse cross-section: top (11), right (12), bottom (13), left (14), and center or core (15). Surface penetration measurements were taken, of the extruded article after completion of the temperature measurements, by using a modified "ball-drop" test which involves dropping a weighted hemisphere having a short conical protuberance or "needle" integral on the underside of the hemisphere onto the formed article or structure. The tip of said needle is held such that it just contacts the surface of the test piece. The weight is then released or "dropped" and allowed to settle for ten seconds and then held in place. This drop is followed by a measurement of the depth of penetration of the weighted hemisphere, thus giving an indication of "handleability" of the body or object. The following table describes the results of the described experiments:

| Electrodes | Electrode Height | Extrusion Rate | Temperatures (°F.) | | | | | | Surface Penetration (0.1 mm) | | | |
|---|---|---|---|---|---|---|---|---|---|---|---|---|
| | | | RF OFF | | | RF ON | | | RF OFF | | RF ON | |
| | | | Top | Btm | Core | Top | Btm | Core | Top | Bottom | Top | Bottom |
| Planar-Horiz. | 4¼" | .17 in/sec | 85° | 85° | 88° | 165° | 115° | 203° | 11.4 | 11.4 | 4.4 | 10.2 |
| | | .44 in/sec | 85° | 85° | 88° | 155° | 109° | 154° | 11.4 | 11.4 | 6.6 | 11.4 |
| Coil-Horiz. | — | .18 in/sec | — | — | — | 150° | 131° | 184° | — | — | 10.0 | 7.8 |
| | | .53 in/sec | — | — | — | 108° | 106° | 119° | — | — | 10.5 | 7.2 |
| Coil-Vertical | — | .38 in/sec | — | — | — | 119° | 126° | 143° | — | — | 8.7 | 9.0 |

Exposure time to the radio frequency energy varied with the extrusion rate and were approximately 45 to 118 seconds for the planar/air bearing electrode system, with the 20 inch (51 cm) electrodes, or were somewhere between about 14 and 40 seconds for the coil electrode system, with an overall length of about 7.25 inch (about 18.4 cm). It is apparent, particularly from the temperature measurements and penetration data in the table, that the application of radio frequency energy indeed enhanced stiffening of the extruded body as desired. It is further apparent that the coil electrode system provided more consistent stiffening than did the planar system in this particular instance.

A further set of experiments were conducted in which the extrudate was a 4.4 inch (about 11 cm) diameter round honeycomb having 300 cells per square inch (about 46 per cm²) in transverse cross section and a wet wall thickness of about either 0.0055 or 0.006 inch (about 0.14 or 0.15 mm). Extrusion rates were generally about 600 pounds (about 273 kg) per hour with one particular run being done in the range of 400 pounds (about 182 kg) per hour. Various electrode shapes were tested as described below:

| Shape | Length | Widths | Diameter | Thickness | Material |
|-------|--------|--------|----------|-----------|----------|
| Flat | 20 | 3½,5 | — | .13 | Perforated Aluminum |
| Curved | 20 | 3½,5 (chords) | 6 7/16, 7½ | .13 | Perforated Aluminum |
| Round | 24 | — | 1.9, 2.4 | .15, .17 | Aluminum Tubing |

Exposure times to the RF energy varied from about 80 to 96 seconds for the 400 pound (182 kg.) per hour extrusion and from about 53 to about 64 seconds for the 600 pound (273 kg.) per hour extrusion rate. The data gathered from this set of experiments is presented in the table below:

| Electrode | Distance From Extrudate | Temperatures (°F.) Center | Top | Bottom | Left | Right |
|-----------|------------------------|---------------------------|-----|--------|------|-------|
| Round | ¼" (0.64 cm) | 170 | 190 | 110 | 105 | 160 |
|  | 1" (2.5 cm) | 115 | 140 | 80 | 100 | 110 |
| Flat | ¼" (0.64 cm) | 165 | 195 | 100 | 125 | 155 |
|  | ½" (1.25 cm) | 165 | 160 | 95 | 110 | 140 |
| Curved | ¼" (0.64 cm) | 165 | 185 | 105 | 130 | 145 |
|  | ½" (1.25 cm) | 145 | 160 | 95 | 115 | 140 |

| Electrode | RF Exposure Time (sec.) | Surface Penetration (0.1 mm) Top | Bottom | Left | Right |
|-----------|------------------------|----------------------------------|--------|------|-------|
| Round | ¼ | 64 | 40 | 180 | 90 | 95 |
|  | 1 | 64 | 145 | 160 | 155 | 160 |
| Flat | ¼ | 53 | 50 | 175 | 85 | 80 |
|  | 1 | 53 | 70 | 190 | 100 | 100 |
| Curved | ¼ | 53 | 45 | 175 | 85 | 80 |
|  | 1 | 53 | 75 | 145 | 110 | 105 |

A further set of experiments were conducted using a 20 KW RF generator provided by Thermex Thermatron Corporation. For this series of experiments a racetrack shaped honeycomb, with transverse cross-sectional axes of about 3.5 inches × 7.4 inches (8.9 cm × 18.8 cm) having 300 cells per square inch (about 46 per cm²) with 0.006 inch (0.015 mm) thick internal walls was formed. For these experiments, sodium stearate levels were reduced to 0.75% of the weight of the dry inorganic materials and the type of methyl cellulose was altered. RF energy was applied for 24 seconds to material formed into 4.4 inch (11.2 cm) round honeycomb structures having 300 cells per square inch (about 46 per cm²) on a cross section and 0.006 inch (0.15 mm) thick interior walls defining the cells. Data from this set of experiments is presented below:

| Electrodes | Distance From Extrudates | Temperatures (°F.) Center | Top | Bottom | Left | Right |
|------------|--------------------------|---------------------------|-----|--------|------|-------|
| Top Curved, 7½" (19 cm) d, 5" chord (12.7 cm), 20" long (51 cm) Bottom Flat, 9⅞" × 20" (24.5 × 51 cm) | ¼" | 196 | 191 | 179 | — | 189 |

For a final experiment, conducted with the 20 KW dielectric generator, 4.4 inch (11 cm) diameter round honeycomb structures were formed having 300 cells per square inch (about 46 per cm²) with either 0.0055 inch or 0.0006 inch (0.14 or 0.15 mm) thick interior walls defining the cells. The 0.006 inch (0.15 mm) interior wall honeycomb structures were formed with a special forming member specially designed to form an outer skin on the honeycomb structure. After formation, these pieces were passed between electrodes which were connected with the dielectric generator. The results of this series of experiments are presented in the table below:

| Forming Member | Electrode | Extrusion Rate lbs/hr (kg/hr) | Temperatures (°F.) Center | Top | Bottom | Left | Right |
|----------------|-----------|-------------------------------|---------------------------|-----|--------|------|-------|
| Conventional | Flat | 600 (273) | 181 | 167 | 115 | 131 | 149 |
| Conventional | Curved | 400 (182) | 194 | 171 | 133 | 147 | 133 |
| Skin-Former | Curved | 600 (273) | 174 | 144 | 109 | 145 | 127 |

Figure 5:
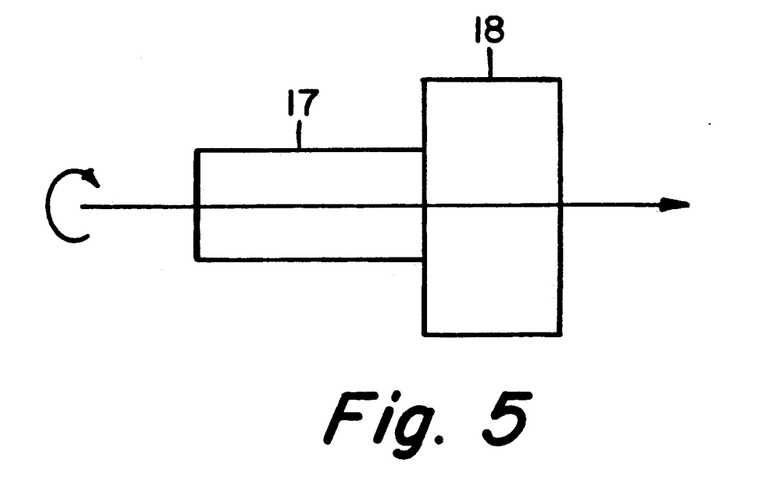
FIG. 5 is a schematic representation of material flow through a delivery means and through a forming member combined with an integral radio frequency heating means.

In considering the desirability of working with low viscosity materials and gaining very rapid stiffening of the material on formation into the desired shape, it is reasonable to propose that the forming member can be combined with the radio frequency source such that the stiffening process may be initiated as the material is just being formed. This concept is schematically presented in FIG. 5 in which the material moves in direction (C) through a delivery means (17), such as an extruder, and through a combined forming member and radio frequency application means (18), such as, for example, an extrusion die assembly containing an RF coil electrode surrounding that portion of the die containing the outlet slots, wherein stiffening of the material is initiated just as it is being formed.

Although particular embodiments have been shown and described and alternative suggested other embodiments and alternatives will occur to those of ordinary skill in the art and such embodiments and modifications will fall within the spirit and scope of the invention as set forth in the appended claims.

We claim:

1. A method of stiffening plastically deformable material as it emerges from a forming member as a shaped body, comprising the step of exposing the shaped body to electromagnetic radiation in the region immediately adjacent to the outlet of the forming member, the plastically deformable material comprising body-forming material, water, and a polymeric agent having a thermal gel point.

2. The method of claim 1, wherein the polymeric agent is a methyl cellulose.

3. The method of claim 1, wherein the deformable material is a ceramic-forming material formed into a honeycomb structure having intersecting internal walls defining cells.

4. The method of claim 3, wherein the thickness of the walls is less than 0.2 mm.

5. A method of stiffening plastically deformable material formed into a shaped body by a forming member having an inlet side and an outlet side, said method comprising the step of exposing the shaped body to electromagnetic radiation within the forming member, in the region immediately adjacent to the inlet side of the forming member, the plastically deformable material comprising body-forming material, water, and a polymeric agent having a thermal gel point.

6. A method of stiffening a formed body comprising the steps of:
combining a forming material, water, and a polymeric agent having a thermal gel point to form a plastically deformable mixture;
passing the mixture through a feed means into a forming member to form a wet formed body; and
gelling the polymeric by passing the wet formed body immediately into an electromagnetic energy field.

7. The method of claim 6, wherein the feed means comprises an extruder.

8. The method of claim 7, wherein the forming member comprises a die.

9. The method of claim 6, wherein the forming material comprises cordierite-forming particulate material.

10. The method of claim 6, wherein the polymeric agent is a methyl cellulose.

11. The method of claim 6, wherein the formed body is a honeycomb structure.

12. The method of claim 11, wherein the honeycomb structure comprises walls defining cells, the walls having a thickness less than 0.20 mm.

13. The method of claim 6, wherein the electromagnetic energy is in the radio frequency range.

14. The method of claim 13, wherein the electromagnetic energy is generated by connecting electrodes to a radio frequency source.

15. The method of claim 14, wherein the radio frequency source is a high frequency generator.

16. The method of claim 6, wherein the formed body is exposed to electromagnetic radiation for a period of up to 2 minutes immediately after the formed body emerges from the forming member.

17. The method of claim 16, wherein the formed body is exposed to electromagnetic radiation in the region immediately on the exit side of the forming member.

18. The method of claim 16, wherein the formed body is exposed to electromagnetic radiation before the formed body exits the forming member.

19. A method of stiffening a honeycomb structure comprising the steps of:
combining a forming material, water, and a polymeric agent having a thermal gel point to form a plastically deformable mixture;
passing the mixture through an extruder into an extrusion die to form a honeycomb structure, the honeycomb structure being defined by intersecting walls surrounding open, elongated cells extending longitudinally through the honeycomb structure;
passing the honeycomb structure immediately and directly, into an electromagnetic energy field as it emerges from the extrusion die, the electromagnetic energy field being located adjacent to the exit of the extrusion die; and
gelling the polymeric agent by exposing the honeycomb structure to the electromagnetic energy field for a time sufficient to stiffen and make the structure self-supporting.

20. The method of claim 19, wherein the thickness of the intersecting walls is in the range of 0.06–0.15 mm.

* * * * *

UNITED STATES PATENT AND TRADEMARK OFFICE
CERTIFICATE OF CORRECTION

PATENT NO. : 5,223,188

DATED : June 29, 1993

INVENTOR(S) : Kevin R. Brundage, Donald L. Guile and Merrill Lynn

It is certified that error appears in the above-identified patent and that said Letters Patent is hereby corrected as shown below:

Cover page - "Abstract" should read "Abstract of the Disclosure"

Col. 3, line 12 - insert "," after "bodies"

Col. 8, line 56 - "time" should read "times"

Col. 9, 4th line of 1st table - "6 7/16" should read "6-7/16"

Col. 10, 3rd line of 1st table - "Extrudates" should read "Extrudate"

Col. 10, line 23 - "0.0006" should read "0.006"

Col. 11, line 33 - insert "agent" after "polymeric"

UNITED STATES PATENT AND TRADEMARK OFFICE
CERTIFICATE OF CORRECTION

PATENT NO. : 5,223,188
DATED : June 29, 1993
INVENTOR(S) : Kevin R. Brundage, et al.

Page 2 of 2

It is certified that error appears in the above-indentified patent and that said Letters Patent is hereby corrected as shown below:

Col. 12, line 34, delete "," after "directly".

Signed and Sealed this

Fifth Day of April, 1994

*Attest:*

BRUCE LEHMAN

*Attesting Officer*     *Commissioner of Patents and Trademarks*